(12) United States Patent
Flansburg et al.

(10) Patent No.: US 6,393,432 B1
(45) Date of Patent: May 21, 2002

(54) METHOD AND SYSTEM FOR AUTOMATICALLY UPDATING DIAGRAMS

(75) Inventors: Miles Clay Flansburg, Broken Arrow; Srinivas S. Moola, Tulsa, both of OK (US)

(73) Assignee: Visionael Corporation, Palo Alto, CA (US)

( * ) Notice: Subject to any disclaimer, the term of this patent is extended or adjusted under 35 U.S.C. 154(b) by 0 days.

(21) Appl. No.: 09/325,009

(22) Filed: Jun. 2, 1999

(51) Int. Cl.[7] .............................................. G06F 17/30
(52) U.S. Cl. .................................... 707/104.1; 709/201
(58) Field of Search .............................. 707/102–104.1; 345/853; 706/53; 709/201

(56) References Cited

U.S. PATENT DOCUMENTS

| | | | |
|---|---|---|---|
| 5,517,605 A | 5/1996 | Wolf | 707/104.1 |
| 5,862,325 A | 1/1999 | Reed et al. | 709/201 |
| 6,167,406 A | * 12/2000 | Hoskins et al. | 707/102 |

* cited by examiner

Primary Examiner—Hosain T. Alam
Assistant Examiner—Jean Bolte Fleurantin
(74) Attorney, Agent, or Firm—Sawyer Law Group LLP

(57) ABSTRACT

A method and system in accordance with the present invention for automatically updating graphical diagrams of logical network layouts is disclosed. The method combines a graphics file with a list of information associating the graphical elements with the database objects and extends a graphics program to automatically reflect database changes in the graphics file and to respond to changes in the database. Through the use of a system and method in accordance with the present invention the user is allowed to create, edit, store, and distribute graphical diagrams of logical network layouts. The diagrams can be created automatically and then edited and distributed by the user. In addition, the user is able to edit the network diagrams without affecting the current as-built view of the network. Finally, the system tracks every network device, passive and active, and associates it with the appropriate physical and logical locations, specifications, serial numbers, warranty information, etc.

22 Claims, 7 Drawing Sheets

Combining a graphics file with a list of information associating graphical elements with objects that are within a database. — 200

Extending a graphics program to reflect the changes in the database with the graphics file and to respond to changes in the database. — 202

FIG. 3

METHOD AND SYSTEM FOR AUTOMATICALLY UPDATING DIAGRAMS

FIELD OF INVENTION

The present invention relates generally to diagrams of logical network layouts and more particularly to a method and system for automatically updating such diagrams.

BACKGROUND OF THE INVENTION

Leading physical management products evolved from the computer-aided design (CAD) world. The products would use CAD diagrams to graphically represent the network configuration. FIG. 1 displays a typical CAD setup where a system user 10 accesses a relational database 14 with a CAD program 12 to make changes to the network configuration. Like floor plans and other blueprints, these diagrams effectively display the network in terms of scalability and configuration. However they require a trained operator to read and manipulate them in order to make routine moves, adds, and changes (MACs). Although the products could obtain some of the necessary data for these MACs from compatible electronic databases or even import the data from CAD files, the MACs still require substantial manual data entry to accurately document the entire physical infrastructure. Usually customers with electronic records of their cabling can find a way to import the data without reentering it however, most installations do not maintain accurate records of their passive cabling and components. Maintaining them, manually or electronically, has always been a problem, but failing to do so wastes thousands of dollars as technicians search aimlessly through a maze of wiring to perform routine MACs and resolve problems.

Network Management Systems (NMSs) provide administrators with information regarding whether specific devices are up or down, as well as information about how devices are connected to each other. FIG. 2 shows how a system administrator 100 accesses the relational database 104 via a typical NMS 102. However, these systems don't comprehensively track the network devices or associate them with their appropriate physical and logical locations. Nor do they provide details as to how the objects are connected or the details of intermediate devices.

Accordingly, conventional solutions to these issues are problematic in the sense that the solutions are either fully automatic (i.e. NMSs) and cannot be edited by the user or are fully editable and do not automatically update (i.e. CAD systems) the relational database. Therefore, what is needed is a method and system that allows the user to create, edit, store, and distribute graphical diagrams of logical network layouts.

The method and system should allow for diagrams to be created automatically and then edited and distributed by the user. The method and system should also allow a user to easily edit the network diagrams without affecting the current as-built view of the network. In addition, the method and system should also be able to track network devices, passive and active, and associate them with the appropriate physical and logical locations, specifications, serial numbers, warranty information, etc. Finally, the system and method should be easily implemented and cost effective. The present invention addresses such a need.

SUMMARY OF THE INVENTION

A method and system in accordance with the present invention for automatically updating graphical diagrams of logical network layouts is disclosed. The method combines a graphics file with a list of information associating the graphical elements with objects that are within a database and extends a graphics program to reflect the changes in the database with the graphics file and to respond to changes in the database.

Through the use of a system and method in accordance with the present invention, a user can create, edit store, and distribute graphical diagrams of logical network layouts. The diagrams can be created automatically and then edited and distributed by the user. In addition, the user is able to edit the network diagrams without affecting the current as-built view of the network. Finally, the system and method in accordance with the present invention allows for tracking every network device, passive and active, and provides for associating network devices with the appropriate physical and logical locations, specifications, serial numbers, warranty information, etc.

BRIEF DESCRIPTION OF THE DRAWINGS

FIG. 3 is a simple block diagram of a system in accordance with the present invention.

DETAILED DESCRIPTION OF THE INVENTION

Figure 1:
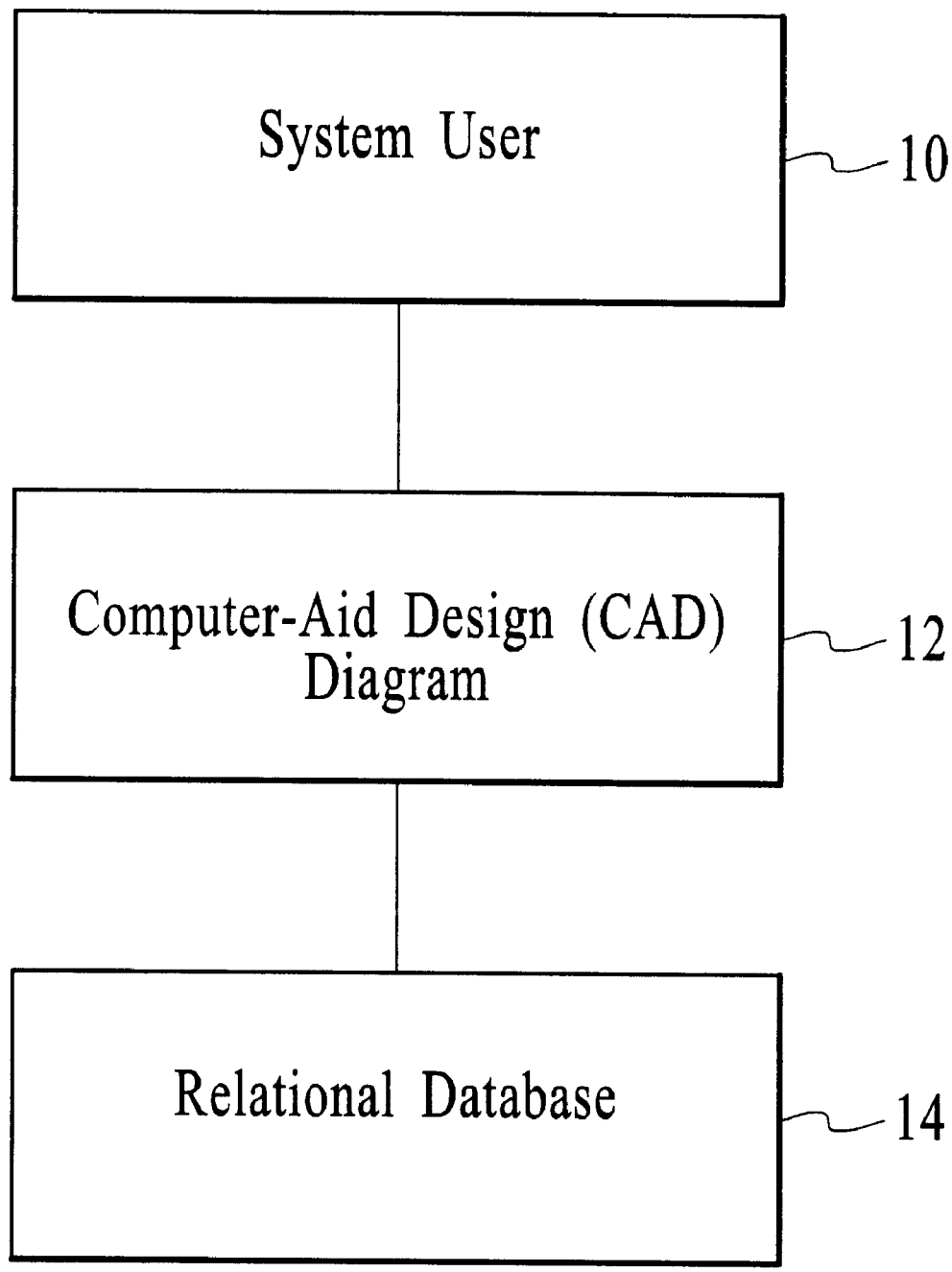
FIG. 1 shows a conventional CAD management environment.
Figure 2:
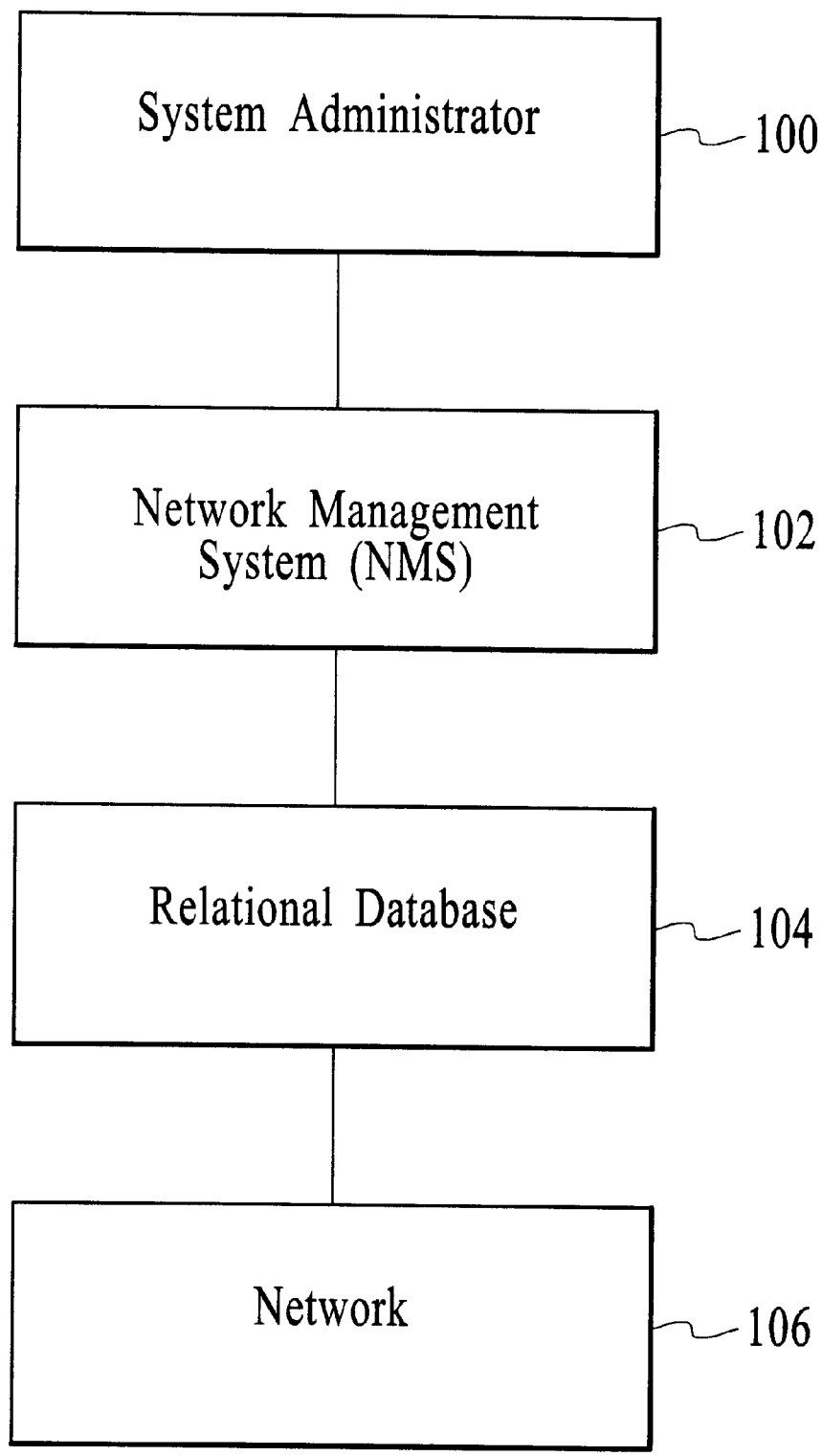
FIG. 2 shows a conventional Network Management System environment.

The present invention provides a method and system for automatically updating diagrams of logical network layouts. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

A method and system in accordance with the present invention is disclosed in the context of a preferred embodiment. The preferred embodiment allows for the graphical representation of a network or a network segment based on the actual network configuration information stored in a relational database. The preferred embodiment operates based on the knowledge of the actual network configuration, so it associates the right cable with the new element and its location. These are called "virtual drawings". Instead of pulling up a CAD floor plan, the preferred embodiment builds a view of the network segment based on user input. In other words, it searches the relational database for the requested information and associates it with a simple drawing. It only moves database queries rather than the entire graphics. It allows logical views of the network plan as well as physical views. This enables users to create network designs using a set of canned and customizable network symbols. The designs created using the logical view sketchpad can then be viewed using a graphics program, such as Visio. Integrated into the preferred embodiment of the method and system in accordance with the present invention are several custom functions that enhance the graphics program, making it easier for the user to edit these drawings. One of the features of the system's logical view is its capability to add network objects to the physical view with only partial information about the object. This reduces the user's task of having to enter every bit of data about an object before adding it to the overall network design.

Although the present invention has been described in the context of a preferred embodiment, one of ordinary skill in the art will readily recognize that there could be variations to the embodiment and those variations would be within the spirit and scope of the present invention. For example, the method and system in accordance with the present invention could be used with a CAD system without departing from the spirit and scope of the appended claims.

The method and system in accordance with the present invention is a comprehensive physical management system that dynamically creates virtual drawings from information provided by the user. The method and system in accordance with the present invention automatically draws images of network devices based on the rules inherent in the system. The user creates a graphical representation of a device by extracting the corresponding data from the relational database and models the device based on a previously established rule set. The user can then create an object graphically and automatically update the underlying relational database simultaneously.

To describe the operation of a system in accordance with the present invention, refer now to FIG. 3. FIG. 3 is a simple flowchart of a system in accordance with the present invention. First, a graphics file is combined with a list of information that associating graphical elements with objects that are within a database, via step 200. Next, the graphics program is extended to reflect the changes in the database with the graphics file and to respond to changes in the database, via step 202.

Figure 4:
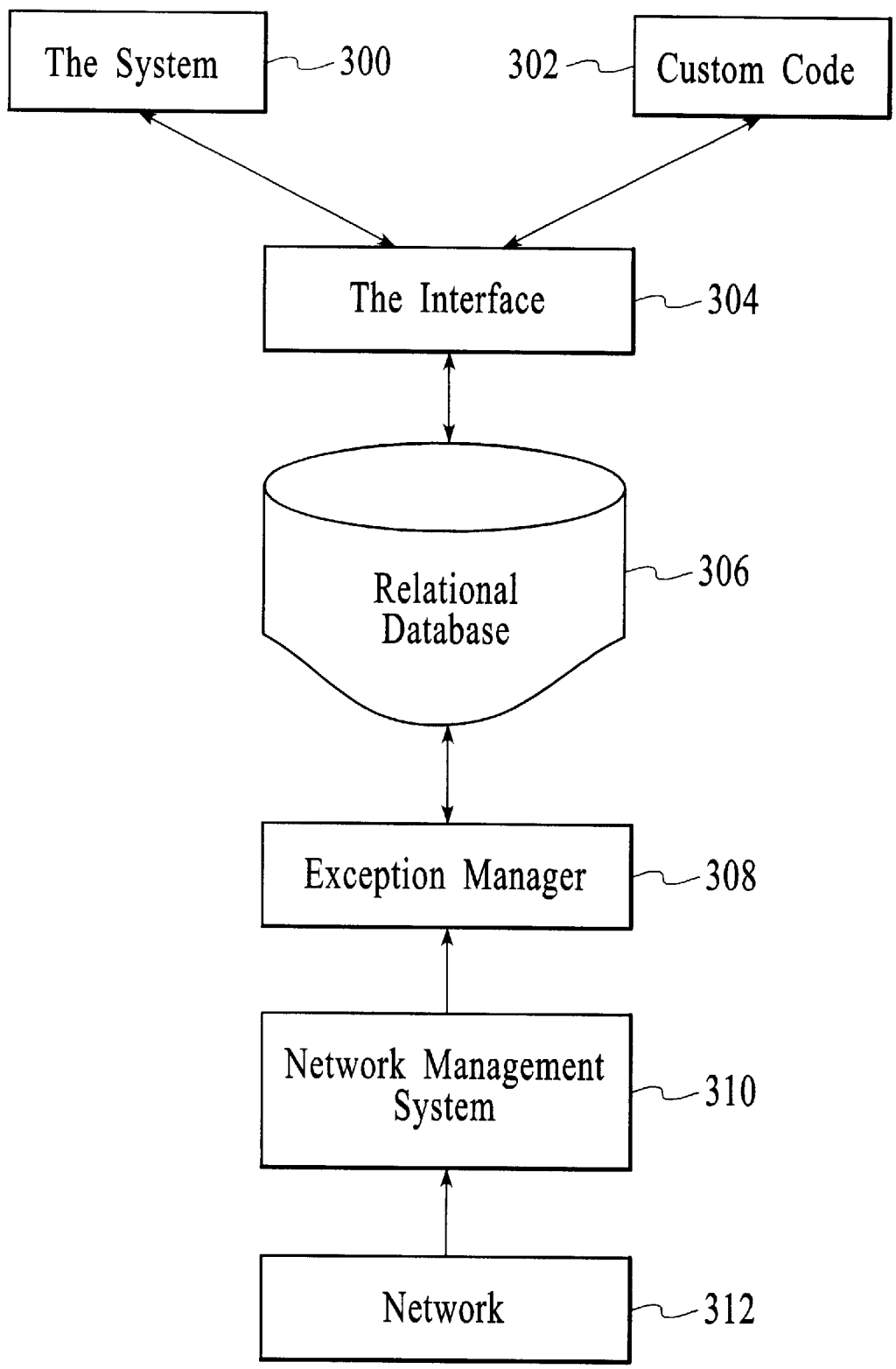
FIG. 4 shows a block diagram of a system for providing graphical diagrams in accordance with the present invention.

To describe the operation of the present invention in more detail, FIG. 4 is a simple flow diagram of a system in accordance with the present invention. The system 300 and the custom code 302 communicate with the relational database 306 through the interface 304. The relational database 306 then interacts with the NMS 208 through the exception manager 308, to communicate with the network 312.

Through the use of a system and method in accordance with the present invention, a user can create, edit, store, and distribute graphical diagrams of logical network layouts. The diagrams can be created automatically and then edited and distributed by the user. In addition, the user is able to edit the network diagrams without affecting the current as-built view of the network. Finally, the system and method in accordance with the present invention allows for tracking every network device, passive and active, and provides for associating network devices with the appropriate physical and logical locations, specifications, serial numbers, warranty information, etc.

Figure 5:
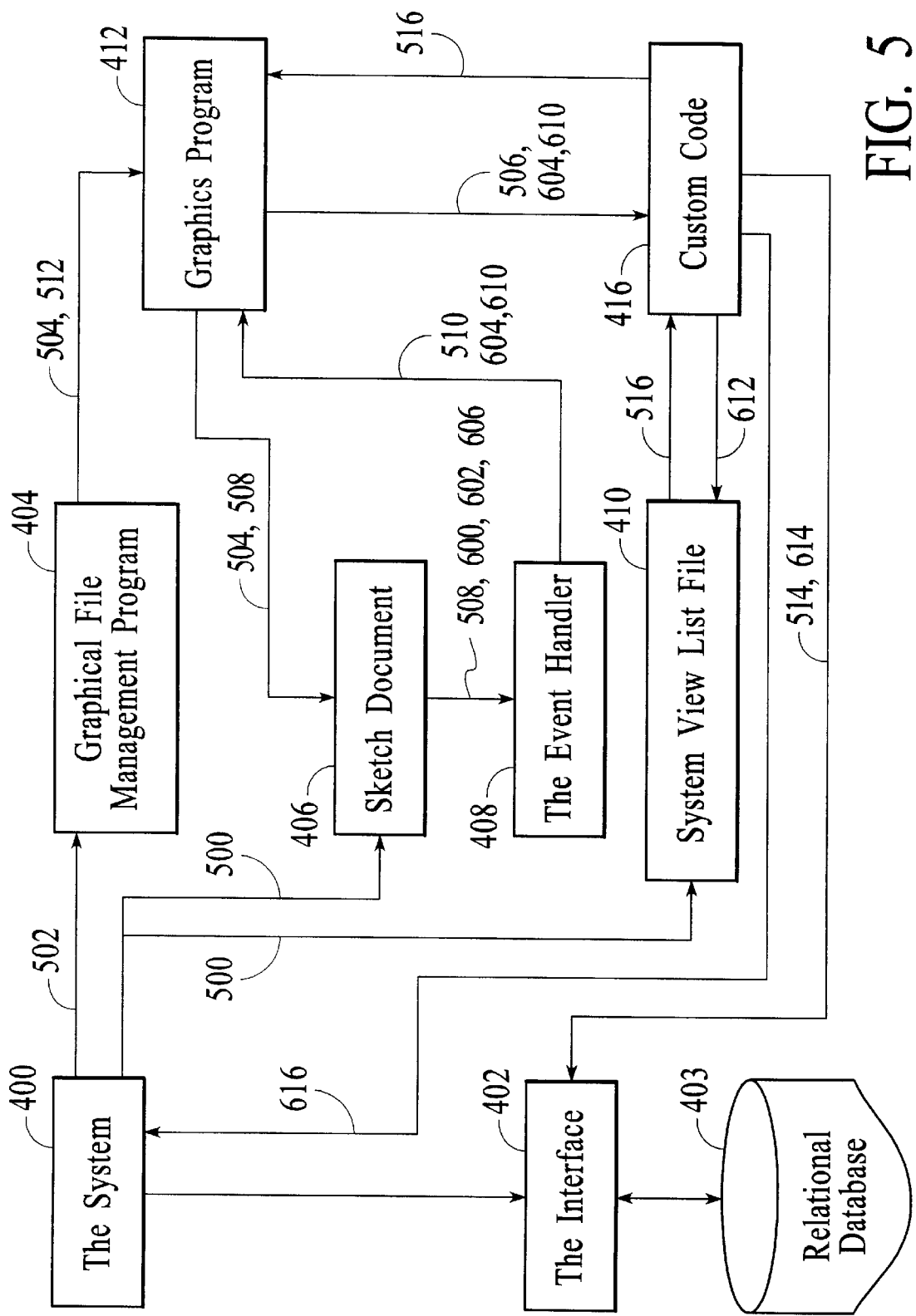
FIG. 5 is a flowchart of the operation of the system in accordance with the present invention.

To more specifically understand the method and system of the present invention refer now to the following detailed description of a preferred embodiment of a system in accordance with the present invention along with the accompanying FIG. 5. A Graphical File Management Program (GFMP) 404 is used to manage the details of initializing and launching a graphics program 412. An example of a GFMP is Vislaunch, which is manufactured by Visionael Corporation. A typical example of a graphics program is Visio, which is manufactured by Visio Corporation. The graphics program 412 is utilized by the system user to create a sketch document 406. The event handler 408 handles or dispatches events that are generated within the sketch document 406 via the graphics program 412. The System View List (VL) 410 file is the list of information associating graphical objects in the graphics file with database objects in the relational database 403. An interface 402 communicates with the relational database while the custom code 416 contains most of the proprietary code that allows the relational database 403 to interact with the sketch document 406.

Operation

Figure 6:
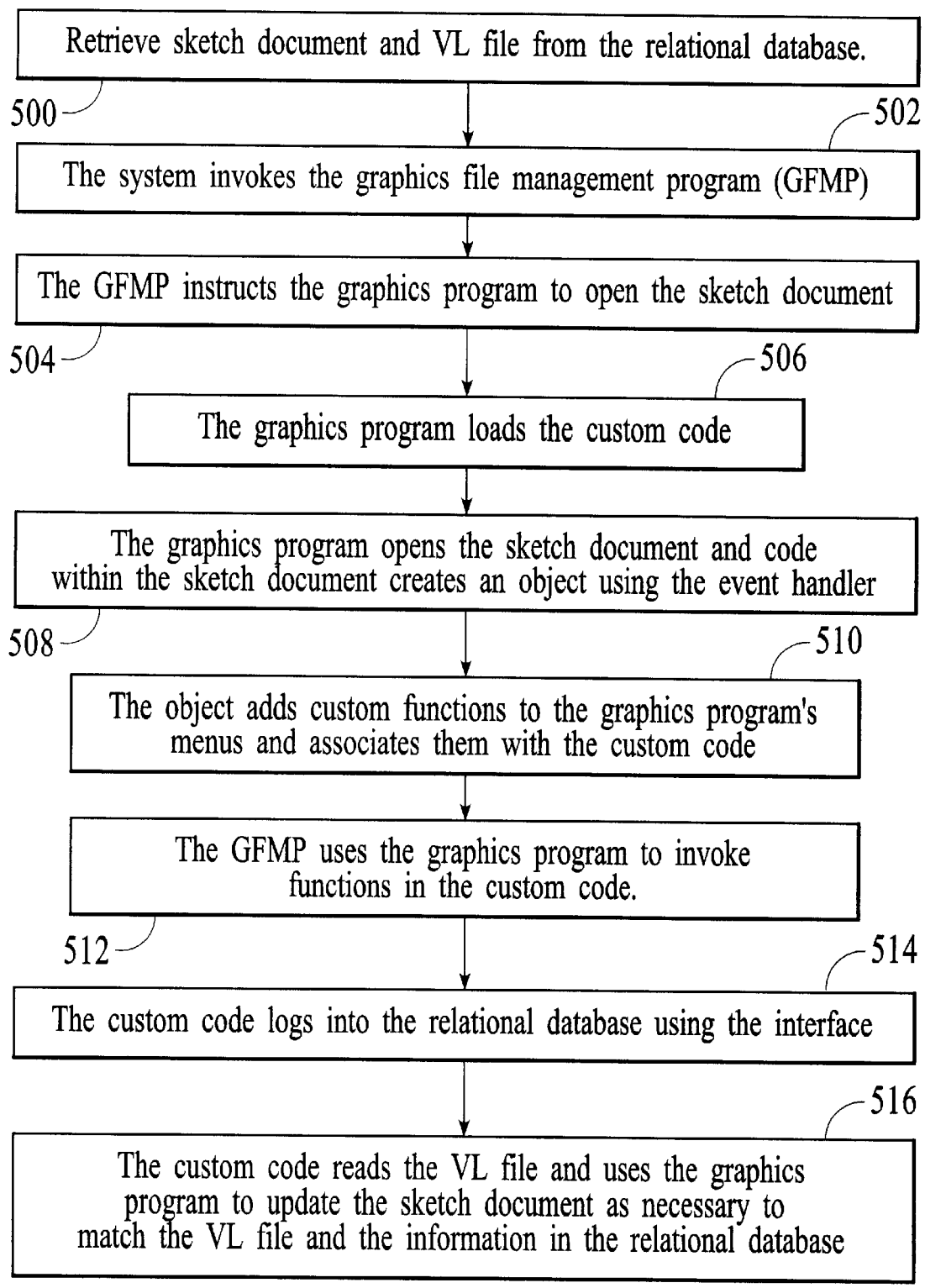
FIG. 6 is a flowchart of how the system in accordance with the present invention associates graphical elements with objects that are within a database.
Figure 7:
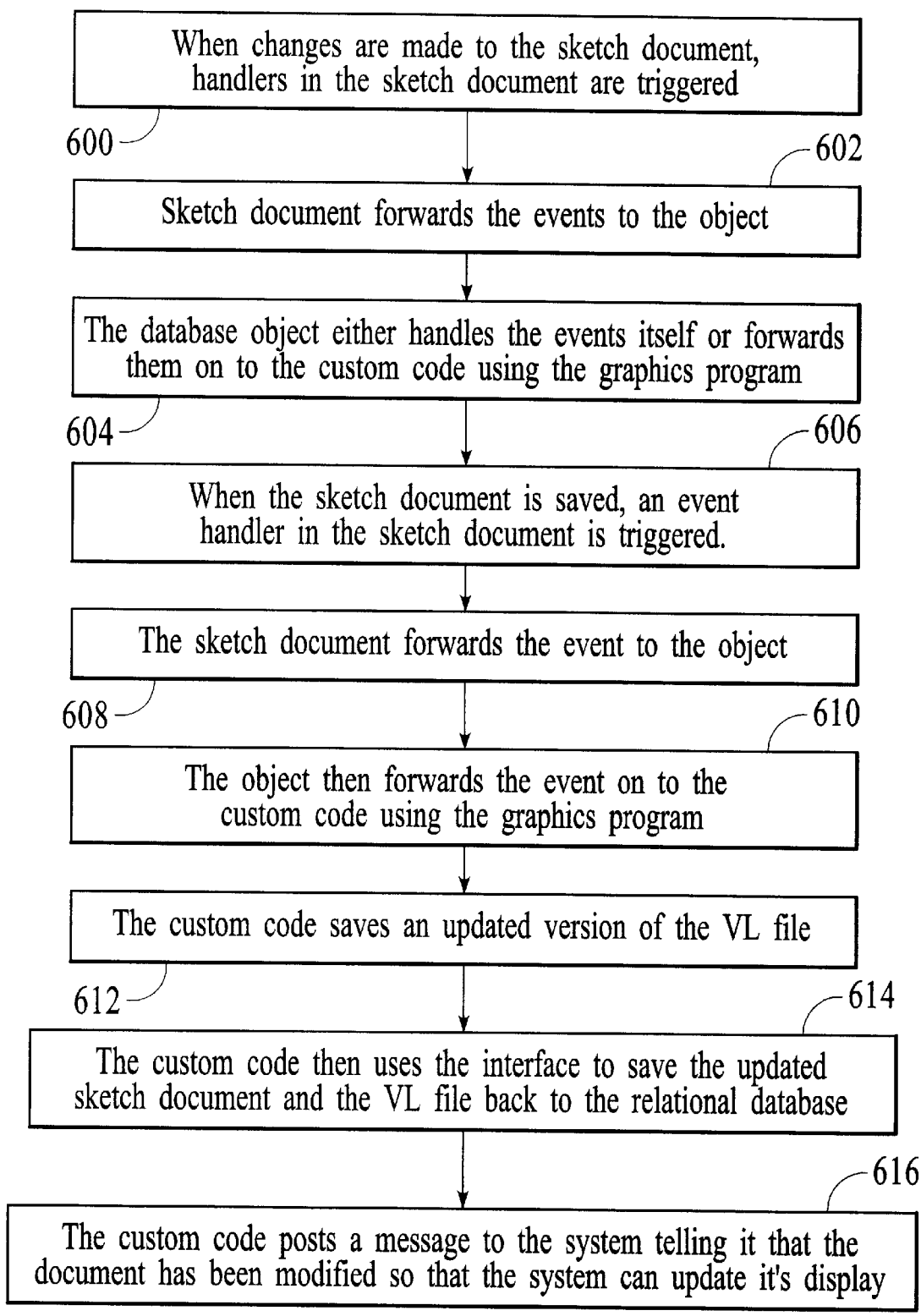
FIG. 7 is a flowchart of how the system in accordance with the present invention extends the graphics program to reflect changes in the database with the graphics file.

To more fully describe the operation and modular interaction of the present invention in the context of the preferred embodiment, FIG. 5 is a block diagram of the operation of the system in accordance with the present invention. FIG. 6 is a detailed flowchart of how the system in accordance with the present invention associates graphical elements with objects within a database. FIG. 7 is a detailed flowchart of how the system in accordance with the present invention extends the graphics program to reflect changes in the database with the graphics file.

Associating Graphical Elements With Objects Within a Database

Referring to FIG. 5 and FIG. 6 together first the system retrieves the sketch document 406 and the VL file 410 from the relational database 403, via step 500. The system then invokes the GFMP 404, via step 502, which in turn instructs the graphics program 412 to open the sketch document 406, via step 504. The graphics program 412 then loads the custom code 416, via step 506. Next, the graphics program 412 opens the sketch document 406 and code within the sketch document 406 creates an object (is this an adequate generic term??) using the event handler 408, via step 508. The object then adds custom functions to the graphics program's menus and associates them with the custom code 416 via step 510. Next the GFMP 404 uses the graphics program 412 to invoke functions in the custom code 416 via step 512. The custom code 416 then logs into the database using the interface 402, via step 514. The custom code 416 then reads the VL file 410 and uses the graphics program 412 to update the sketch document 406 as necessary to match the VL file 412 and the information in the relational database 403, via step 516.

Extending the Graphics Program to Reflect Changes in the Database with the Graphics File Referring now to FIG. 5 and FIG. 7 together, when the user makes changes to the sketch document 406, handlers in the sketch document 406 are triggered, via step 600. Next, the sketch document 406 forwards the events to the object via step 602. The object either handles the events itself or forwards them on to the custom code 416 using the graphics program 412, via step 604. This may require updating of internal data, and/or adding, updating, or removing objects from the relational database 403, via the interface 402. When the sketch document 406 is saved, an event handler in the sketch document 406 is triggered, via step 606. The sketch document 406 then forwards the event to the object, via step 608. The object then forwards the event on to the custom code 416 using the graphics program 412, via step 610. The custom code 416 then saves an updated version of the VL file 410, via step 612. Next, the custom code 416 uses the interface 402 to save the updated sketch document 406 and the VL file 410 back to the relational database 403, via step 614. Finally, the custom code 416 posts a message to the system telling it that the document has been modified so that the system can update it's display, via step 616.

Advantages

Instead of utilizing CAD diagrams, a system in accordance with the present invention uses a basic drawing program with an underlying knowledge base. The user picks a device type from a menu, the system creates the device, and the user places it accordingly. However, the user does not have to figure out in which cell in a CAD schematic to place new devices and cabling, but simply assigns them a new location, and the system does the rest. The user can view the network as it was originally configured and then compare it to the network's current state or even a proposed state. These virtual scenarios make designing network changes and expansions easier, providing a quick frame of reference for the designer to evaluate his or her decisions.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for automatically updating diagrams of logical network layout systems comprising the steps of:
   a) combining a graphics file from a graphics program with a list of information associating graphical elements with objects that are within a database, wherein the combining step comprises the steps of:
      (a1) retrieving a sketch document and view list file from a database;
      (a2) invoking a graphical file management program to instruct a graphics program to open the sketch document;
      (a3) loading of a custom code program by the graphics program;
      (a4) creating an object using an event handler;
      (a5) adding custom functions to the menus of the graphics programs with the object and associating the custom functions with the custom code program;
      (a6) causing the graphical file management program to use the graphics program to invoke functions in the custom code program;
      (a7) logging into the database using an interface with the custom code; and
      (a8) reading the view list file with the custom code and using the graphics program to update the sketch document as necessary to match the view list file and information in the database; and
   b) extending a graphics program to reflect the changes in the database with the graphics file and to respond to changes in the database.

2. The method of claim 1 wherein the graphics file is obtained from a graphics program.

3. The method of claim 2 wherein the graphics program comprises Visio.

4. The method of claim 3 wherein the list of information comprises a system view list file.

5. The method of claim 1 wherein the database comprises a relational database.

6. The method of claim 1 wherein the extending step (b) further comprises the steps of:
   (b1) changing the sketch document;
   (b2) triggering event handlers in the sketch document;
   (b3) forwarding events to an object;
   (b4) using the graphics program to forward the events to a custom code program;
   (b5) saving the sketch document;
   (b6) triggering event handlers in the sketch document;
   (b7) having the object use the graphics program to forward the events on to the custom code program;
   (b8) saving of an updated version of a view list file by the custom code program;
   (b9) having the custom code program use the interface to save the updated sketch document and the view list file back to the database; and
   (b10) posting of a message to a system telling it that the document has been modified so that the system can update it's display.

7. The method of claim 6 wherein the graphical file management program is Vislaunch.

8. The method of claim 6 wherein the graphics program comprises Visio.

9. The method of claim 6 wherein the custom code is NetworkSketcher.vsl.

10. The method of claim 6 wherein the event handler is AgsNetSketch OCX.

11. The method of claim 6 wherein the interface is AgsNetObjs.dll.

12. A system for automatically updating diagrams of logical network layout systems comprising:
   means for combining a graphics file from a graphics program with a list of information associating graphical elements with objects that are within a database, wherein the means for combining comprises:
      means for retrieving a sketch document and view list file from a database;
      means for invoking a graphical file management program to instruct a graphics program to open the sketch document;
      means for loading of a custom code program by the graphics program;
      means for creating an object using an event handler;
      means for adding custom functions to the menus of the graphics programs with the object and associating the custom functions with the custom code program;
      means for causing the graphical file management program to use the graphics program to invoke functions in the custom code program;
      means for logging into the database using an interface with the custom code; and
      means for reading the view list file with the custom code and using the graphics program to update the sketch document as necessary to match the view list file and information in the database; and
   means for extending a graphics program to reflect the changes in the database with the graphics file and to respond to changes in the database.

13. The system of claim 12 wherein the graphics file is obtained from a graphics program.

14. The system of claim 13 wherein the graphics program comprises Visio.

15. The system of claim 14 wherein the list of information comprises a system view list file.

16. The system of claim 12 wherein the database comprises a relational database.

17. The system of claim 12 wherein the extending means further comprises:
   means for changing the sketch document;
   means for triggering event handlers in the sketch document;
   means for forwarding events to an object;
   means for using the graphics program to forward the events to a custom code program;
   means for saving the sketch document;
   means for triggering event handlers in the sketch document;
   means for having the object use the graphics program to forward the events on to the custom code program;
   means for saving of an updated version of a view list file by the custom code program;
   means for having the custom code program use the interface to save the updated sketch document and the view list file back to the database; and
   means for posting of a message to a system telling it that the document has been modified so that the system can update it's display.

18. The system of claim 17 wherein the graphical file management program is Vislaunch.

19. The system of claim 17 wherein the graphics program comprises Visio.

20. The system of claim 17 wherein the custom code is NetworkSketcher.vsl.

21. The system of claim 17 wherein the event handler is AgsNetSketch OCX.

22. The system of claim 17 wherein the interface is AgsNetObjs.dll.

* * * * *